(12) United States Patent
Hehenberger (10) Patent No.: US 9,728,961 B2
(45) Date of Patent: Aug. 8, 2017

(54) METHOD OF LOAD LEVELING IN AN ENERGY-GENERATING INSTALLATION

(76) Inventor: Gerald Hehenberger, Klagenfurt (AT)

( * ) Notice: Subject to any disclaimer, the term of this patent is extended or adjusted under 35 U.S.C. 154(b) by 971 days.

(21) Appl. No.: 13/265,053

(22) PCT Filed: Apr. 20, 2010

(86) PCT No.: PCT/EP2010/002407
§ 371 (c)(1),
(2), (4) Date: Oct. 18, 2011

(87) PCT Pub. No.: WO2010/121783
PCT Pub. Date: Oct. 28, 2010

(65) Prior Publication Data
US 2012/0049807 A1    Mar. 1, 2012

(30) Foreign Application Priority Data

Apr. 20, 2009    (AT) .................................. A 604/2009

(51) Int. Cl.
| F03D 9/00 | (2016.01) |
| H02J 3/01 | (2006.01) |
| H02J 3/18 | (2006.01) |
| F03D 9/11 | (2016.01) |
| F03D 9/25 | (2016.01) |

(52) U.S. Cl.
CPC .................. *H02J 3/01* (2013.01); *F03D 9/11* (2016.05); *F03D 9/255* (2017.02); *H02J 3/1842* (2013.01); *F05B 2260/76* (2013.01); *Y02E 10/72* (2013.01); *Y02E 10/763* (2013.01); *Y02E 40/22* (2013.01); *Y02E 40/40* (2013.01)

(58) Field of Classification Search
CPC .............................. Y02E 70/30; Y02E 10/766
USPC ....................................................... 290/44, 55
See application file for complete search history.

(56) References Cited

U.S. PATENT DOCUMENTS

| 5,476,293 A * | 12/1995 | Yang ............................. 290/4 C |
| 7,569,944 B2* | 8/2009 | Oohara et al. .................. 290/44 |
| 2008/0066569 A1* | 3/2008 | Henenberger .................. 74/434 |
| 2010/0198421 A1* | 8/2010 | Fahimi et al. ................. 700/291 |

FOREIGN PATENT DOCUMENTS

| CN | 101031719 A | 9/2007 |
| CN | 101107442 A | 1/2008 |
| WO | 2006010190 A1 | 2/2006 |

OTHER PUBLICATIONS http://www.learningaboutelectronics.com/Articles/What-is-a-smoothing-capacitor Downloaded Jul. 10, 2013.*
(Continued)

*Primary Examiner* — Vanessa Girardi
(74) *Attorney, Agent, or Firm* — Young & Thompson (57) ABSTRACT

The invention relates to an energy generating installation, especially a wind power station, comprising a drive shaft connected to a rotor (1), a generator (8) and a differential transmission (11 to 13) provided with three drives or outputs. A first drive is connected to the drive shaft, an output is connected to a generator (8), and a second drive is connected to an electrical differential drive (6, 14). The differential drive (6, 14) is connected to a network (10) by means of a frequency converter (7, 15) comprising an electrical energy accumulator in the direct-current intermediate circuit.

9 Claims, 5 Drawing Sheets

(56) References Cited

OTHER PUBLICATIONS

Amit Kumar Jain et al: "Wound Rotor Induction Generator With Sensorless Control and Integrated Active Filter for Feeding Non-linear Loads in a Stand-Alone Grid", IEEE Transactions on Industrial Electronics, vol. 54, No. 1, Jan. 1, 2008 (Jan. 1, 2008), pp. 218-228, XP011199594.
Tremblay E et al: "Grid-Side Converter Control of DFIG Wind Turbines to Enhance Power Quality of Distribution Network", Power Engineering Society General Meeting, 2006, Piscataway, NJ, USA, Jun. 18, 2006 (Jun. 18, 2006), pp. 1-6, XP010943403.
Qiao W et al: "Grid Connection Requirements and Solutions for DFIG Wind Turbines", Energy 2030 Conference, 2008. Energy 2008, Piscataway, NJ, Nov. 17, 2008 (Nov. 17, 2008), pp. 1-8, XP031442513.
Abbey, C.; Joos, G.:"Integration of energy storage with a doubly-fed induction machine for wind power applications", Proceedings 2004 IEEE 35th Annual Power Electronics Specialists Conference, 2004, pp. 1964-1968, XP002599192.
Chad Abbey et al: "Supercapacitor Energy Storage for Wind Energy Applications", IEEE Transactions on Industry Applications, vol. 43, No. 3, May 1, 2007 (May 1, 2007), pp. 769-776, XP011182433.
International Search Report, dated Oct. 7, 2010, in PCT/EP2010/002408.
Chinese Office Action, dated Jul. 2, 2013, from corresponding CN application.

\* cited by examiner

METHOD OF LOAD LEVELING IN AN ENERGY-GENERATING INSTALLATION

BACKGROUND OF THE INVENTION

Field of the Invention

The invention relates to an energy-generating installation, in particular a wind power installation, with a drive shaft connected to a rotor, a generator, and with a differential transmission with three drives and outputs, a first drive being connected to the drive shaft, one output to a generator, and a second drive to an electrical differential drive, and the differential drive being connected to a network via a frequency converter.

The invention furthermore relates to a method for operating an energy-generating installation, in particular a wind power installation, with a differential transmission with an electrical differential drive, the differential drive being connected to a network via a frequency converter with a DC intermediate circuit.

Description of the Related Art

Wind power installations are becoming increasingly important as electricity-generating installations. For this reason, the percentage of power generation by wind is continuously increasing. This in turn dictates, on the one hand, new standards with respect to current quality (especially with respect to reactive current control and behavior of the wind power installations during voltage dips in the network) and, on the other hand, a trend to still larger wind power installations. At the same time, a trend is recognizable toward offshore wind power installations, which trend requires installation sizes of at least 5 MW installed power. Due to the high costs for infrastructure and maintenance and repair of wind power installations in the offshore region, here, both efficiency and also production costs of the installations with the associated use of medium-voltage synchronous generators acquire special importance.

WO2004/109157 A1 shows a complex, hydrostatic "multipath" concept with several parallel differential stages and several switchable clutches, as a result of which it is possible to switch between the individual paths. With the technical design shown, the power and thus the losses of the hydrostatics can be reduced. One major disadvantage is, however, the complicated structure of the entire unit. In this case, the electrical energy fed into the network comes exclusively from the synchronous generator driven by the differential system.

EP 1283359 A1 shows a 1-stage and a multistage differential transmission with an electrical differential drive that drives—via a frequency converter—an electrical machine that is mechanically connected to the network-coupled synchronous generator. In this example, the electrical energy fed into the network also comes exclusively from the synchronous generator driven by the differential system.

WO 2006/010190 A1 shows the drive line of a wind power installation with an electrical differential drive with a frequency converter that is connected to the network parallel to the synchronous generator.

These technical designs do allow the direct connection of medium-voltage synchronous generators to the network; the disadvantages of known embodiments are, however, that differential systems with an electrical differential drive according to the state of the art are not able to reliably compensate for network voltage dips.

BRIEF SUMMARY OF THE INVENTION

The object of the invention is to avoid the aforementioned disadvantages as much as possible.

This object is achieved in an energy-generating installation of the above-mentioned type according to the invention in that the frequency converter in the DC intermediate circuit has an electrical energy store.

This object is achieved in a method of the above-mentioned type according to the invention in that the differential drive is supplied with electrical energy with the aid of an electrical energy store in the DC intermediate circuit of the frequency converter in the case of a voltage dip or a power failure or an overvoltage of the network.

This object is achieved in a method of the above-mentioned type according to the invention in that the differential drive feeds electrical energy into an electrical energy store in the DC intermediate circuit of the frequency converter in the case of a voltage dip or power failure or an overvoltage of the network.

It is ensured in a simple way by the energy store that the differential drive can hold the speed of the generator synchronously with the network voltage for the period of a network voltage failure.

Preferred embodiments of the invention are the subject matter of the other dependent claims.

BRIEF DESCRIPTION OF THE DRAWINGS

Preferred embodiments of the invention are described in detail below with reference to the attached drawings.

DETAILED DESCRIPTION OF THE PREFERRED EMBODIMENTS

The output of the rotor of a wind power installation is calculated from the formula:

Rotor Output=Rotor Area*Power Coefficient*Wind Speed3*Air Density/2 the power coefficient being dependent upon the high speed number (=ratio of blade tip speed to wind speed) of the rotor of the wind power installation. The rotor of a wind power installation is designed for an optimum power coefficient based on a high speed number that is to be established in the course of development (in most cases, a value of between 7 and 9). For this reason, in the operation of the wind power installation in the partial load range, a correspondingly low speed can be set to ensure optimum aerodynamic efficiency.

Figure 1:
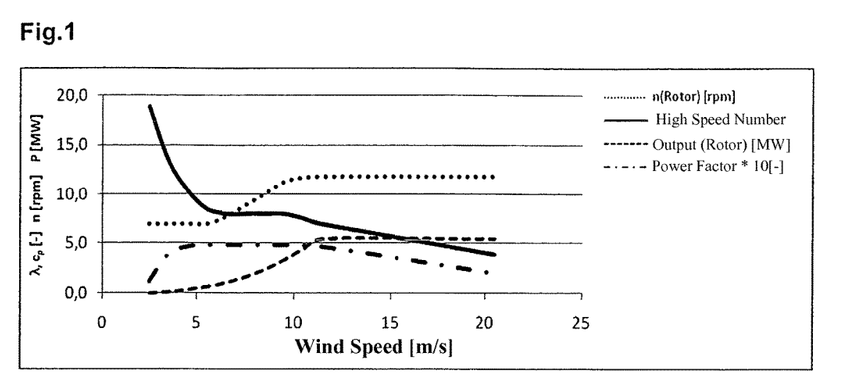
FIG. 1 shows—for a 5 MW wind power installation according to the state of the art—the power curve, the rotor speed, and the resulting characteristics such as the high speed number and the power coefficient.

FIG. 1 shows the ratios for rotor output, rotor speed, high speed number and power coefficient for a given speed range of the rotor and an optimum high speed number of 8.0–8.5. It is apparent from the diagram that as soon as the high speed number deviates from its optimum value of 8.0–8.5, the power coefficient drops, and thus according to the aforementioned formula, the rotor output is reduced according to the aerodynamic characteristic of the rotor.

Figure 2:
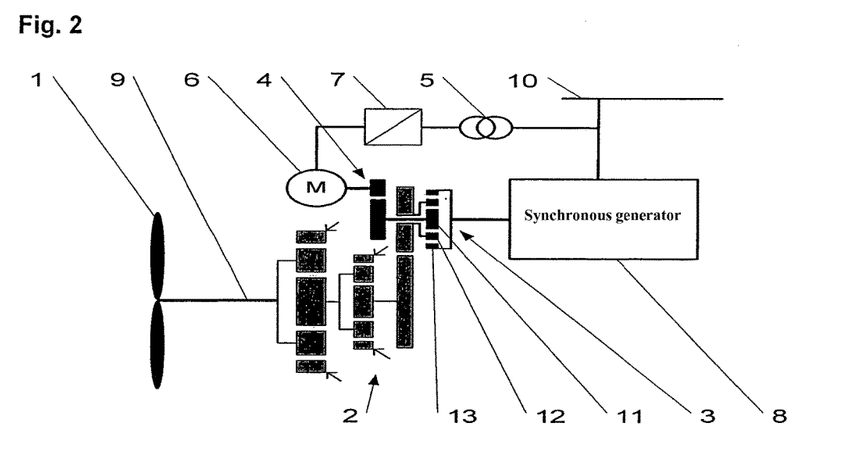
FIG. 2 shows the principle of a differential transmission with an electrical differential drive according to the state of the art.

FIG. 2 shows one possible principle of a differential system for a wind power installation consisting of differential stages 3 and 11 to 13, a matching transmission stage 4, and an electrical differential drive 6. The rotor 1 of the wind power installation that sits on the drive shaft 9 for the main transmission 2 drives the main transmission 2. The main transmission 2 is a 3-stage transmission with two planetary stages and one spur-wheel stage. Between the main transmission 2 and the generator 8 is the differential stage 3 that is driven by the main transmission 2 via planetary carriers 12 of the differential stage 3. The generator 8—preferably a separately-excited medium-voltage synchronous generator—is connected to the ring gear 13 of the differential stage 3 and is driven by the latter. The pinion 11 of the differential stage 3 is connected to the differential drive 6. The speed of the differential drive 6 is controlled in order, on the one hand, at variable speed of the rotor 1, to ensure a constant speed of the generator 8 and, on the other hand, to control the torque in the complete drive line of the wind power installation. In order to increase the input speed for the differential drive 6, in the case shown, a 2-stage differential transmission is chosen that calls for a matching transmission stage 4 in the form of a spur-wheel stage between the differential stage 3 and differential drive 6. The differential stage 3 and matching transmission stage 4 thus form the 2-stage differential transmission. The differential drive is a three-phase a.c. machine that is connected to the network 10 via frequency converter 7 and transformer 5 parallel to the generator 8.

The speed equation for the differential transmission reads:

$$\text{Speed}_{Generator} = x^* \text{Speed}_{Rotor} + y^* \text{Speed}_{Differential\ Drive},$$

the generator speed being constant, and the factors x and y can be derived from the selected transmission ratios of the main transmission and differential transmission.

The torque on the rotor is determined by the prevailing wind and the aerodynamic efficiency of the rotor. The ratio between the torque on the rotor shaft and that on the differential drive is constant, as a result of which the torque in the drive line can be controlled by the differential drive.

The torque equation for the differential drive reads:

$$\text{Torque}_{Differential\ Drive} = \text{Torque}_{Rotor} * y/x,$$

the size factor y/x being a measure of the necessary design torque of the differential drive.

The output of the differential drive is essentially proportional to the product of the percentage deviation of the rotor speed from its base speed times the rotor output, the base speed being that speed of the rotor of the wind power installation at which the differential drive is stationary, i.e., that has speed equal to zero. Accordingly, a greater speed range requires essentially a correspondingly large dimensioning of the differential drive.

Figure 3:
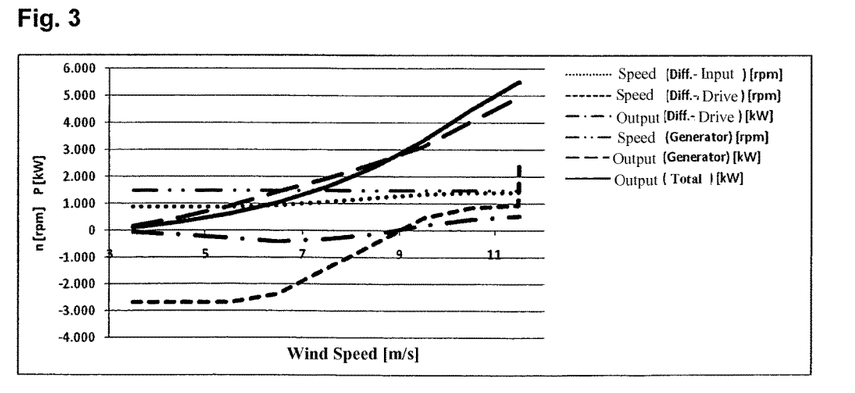
FIG. 3 shows—by way of example according to the state of the art—the speed and power ratios of an electrical differential drive over wind speed.

FIG. 3 shows, for example, the speed and power ratios for a differential stage according to the state of the art. The generator speed is constant due to the connection to the frequency-fixed power grid. In order to be able to use the differential drive correspondingly well, this drive is operated as a motor in the range smaller than the base speed and as a generator in the range greater than the base speed. This leads to the power being fed into the differential stage in the motor range and power being taken from the differential stage in the generator range. In the case of an electrical differential drive, this power is preferably taken from the network or fed into the latter. The sum of the generator power and power of the differential drive yields the total power delivered into the network for a wind power installation with an electrical differential drive.

Figure 4:
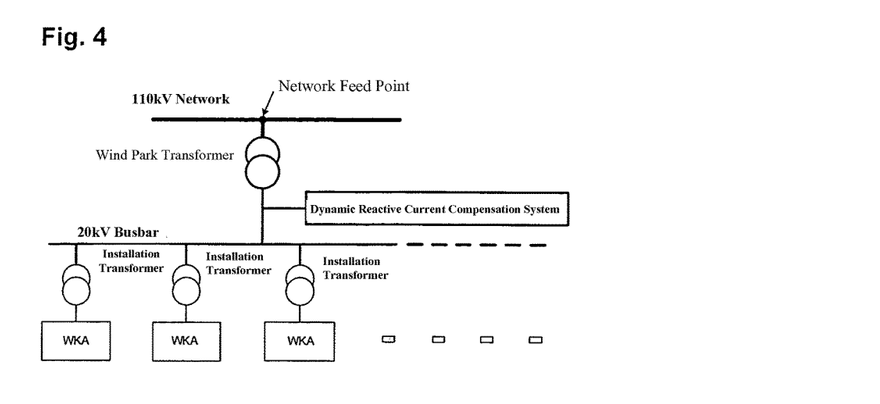
FIG. 4 shows the linked power grid of a conventional wind park.

FIG. 4 shows how wind park networks that connect a large number of wind power installations are conventionally built. For the sake of simplicity, only three wind power installations are shown here, and depending on the size of the wind park, also, e.g., up to 100 or even more wind power installations can be connected in a wind park network. Several wind power installations in a low-voltage embodiment with a rated voltage of, e.g., 690 VAC (in most cases equipped with so-called double-fed three-phase a.c. machines or three phase a.c. machines with full-scale power converters) feed via installation transformer into a bulbar with a voltage level of, e.g., 20 kV. Upstream from the network feed point that is conventionally the transfer site into the network of the power supply company, a wind park transformer is connected that increases the medium voltage of the wind park to a network voltage of, e.g., 110 kV. For this network feed point, with reference to the reactive current factor and voltage constancy, there are guidelines to be met that are in most cases defined by the power supply company. In order to be able to meet the standards with respect to current quality that are becoming continually more strict, on the medium-voltage side, dynamic reactive current compensation systems are being increasingly implemented that keep the voltage in the network feed point within prescribed limits by feeding reactive current into the network and removing reactive current from the network.

Figure 5:
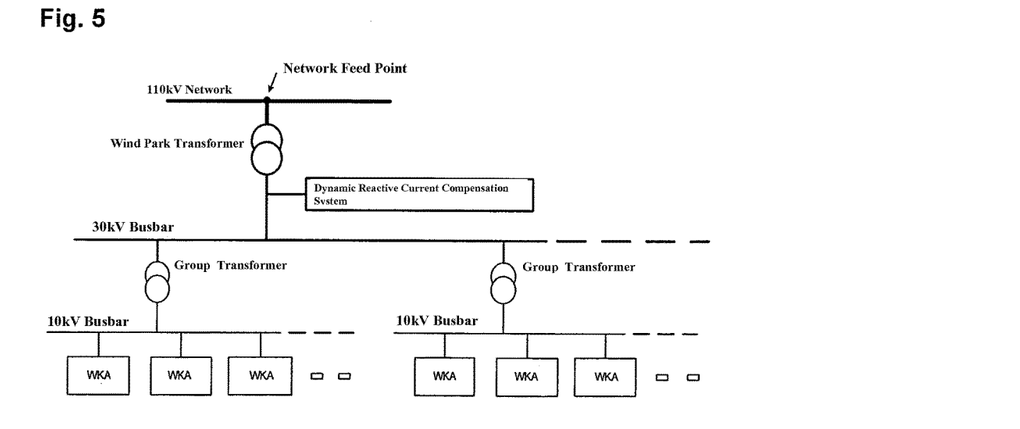
FIG. 5 shows the linked power grid of a wind park with wind power installations with a differential system according to FIG. 2.

FIG. 5 shows one alternative wind park network that connects a large number of wind power installations with differential systems. For the sake of simplicity, only three wind power installations per group are also shown here. Several wind power installations in a medium-voltage embodiment with a rated voltage of, e.g., 10 kV (equipped with so-called separately-excited synchronous generators and electrical differential drives connected in parallel—such as, e.g., in FIG. 2), feed into a busbar and (in the case of very large wind parks) from the latter via group transformer into another busbar with a voltage level of, e.g., 30 kV. Upstream from the network feed point, a wind park transformer is also connected here and increases the medium voltage of the wind park to a network voltage of, e.g., 110 kV. In this example, a dynamic reactive current compensation system is also implemented that is designed to keep the voltage delivered into the network within given boundary values.

Mainly in significant performance leaps of the wind power installations due to wind gusts or network faults, this is a highly dynamic process that cannot be automatically compensated by wind power installations according to the state of the art. Here, it is not only a matter of a constant voltage control of each individual wind power installation. The downstream wind park network consisting of lines and transformers, moreover, requires a reactive current portion that is to be delivered from the wind power installations in order to be able to compensate for the voltage fluctuations resulting from power fluctuations of the wind power installations at the feed point to the extent the latter is not delivered by an already mentioned dynamic reactive current compensation system. This reactive current portion that is to be delivered by the wind power installations is largely dependent upon the impedance of the wind park network and on the electrical output that is to be transmitted into the network, and can be mathematically calculated from these parameters. This means that in one preferred embodiment, the control of each individual wind power installation calculates the reactive current portion necessary due to, e.g., its power fluctuation for the compensation of the wind park network caused by the power fluctuation, and can relay it as additional reactive current demand to the reactive current control of the wind power installation. Alternatively, a central control unit can calculate this reactive current demand that is necessary for the wind park network, and relay it to the individual wind power installations as needed (reactive current setpoint) according to a defined distribution key. This central control unit then sits preferably near the network feed point, and calculates the reactive current demand that is necessary for a constant voltage from the measured wind park output and/or measured network voltage.

It should be added that most of the regenerative energy-generating installations, such as, e.g., wind power installations compared to, e.g., caloric power plants, have the disadvantage that as a result of stochastically accumulating drive energy (gusty wind), large significant performance leaps occur within short time constants. For this reason, the topic of dynamic reactive current compensation for regenerative energy-generating installations is of especially great importance.

Another possibility for improving the dynamics of a wind park network voltage control is the measurement of the wind speed on a preferably separately installed wind measurement mast, and for this purpose, alternatively, also the wind measurement on one or more wind power installations can be used. Since the delivered output of a wind power installation changes with more or less major delay according to the wind speed that is to be set stochastically, the expected power delivery of wind power installations can be deduced from the measured change of the wind speed. Thus, in a further sequence, the reactive current demand for a constant voltage at the network feed point can be calculated beforehand and thus delays are best compensated by the given measurement and control time constants.

Figure 6:
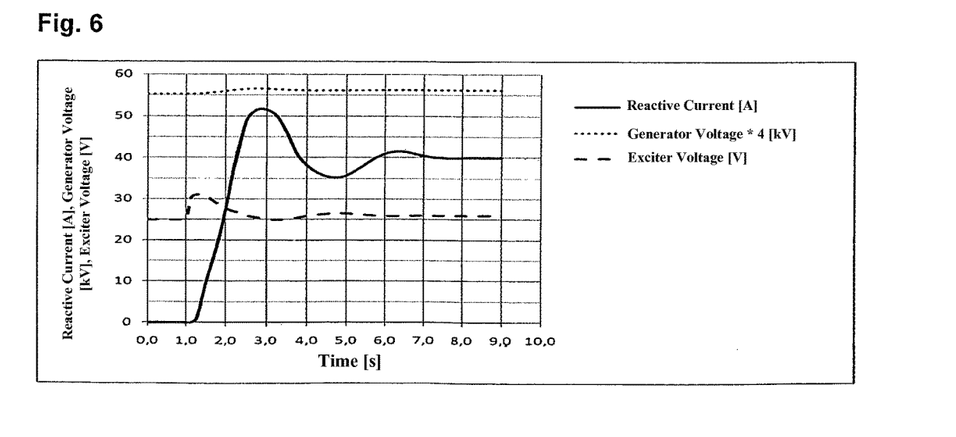
FIG. 6 shows the behavior over time of the reactive current that is to be set in a reactive current setpoint step-change.

FIG. 6 shows the typical behavior of a separately-excited synchronous generator in a setpoint step-change for the reactive current that is to be delivered. At the time of 1.0, the reactive current demand is changed from 0 A to 40 A; this leads to an immediate increase of the exciter voltage in the synchronous generator. It takes roughly 6 seconds until the reactive current is adjusted to the required amount of 40 A. The generator voltage changes according to the reactive current that is to be set.

Figure 7:
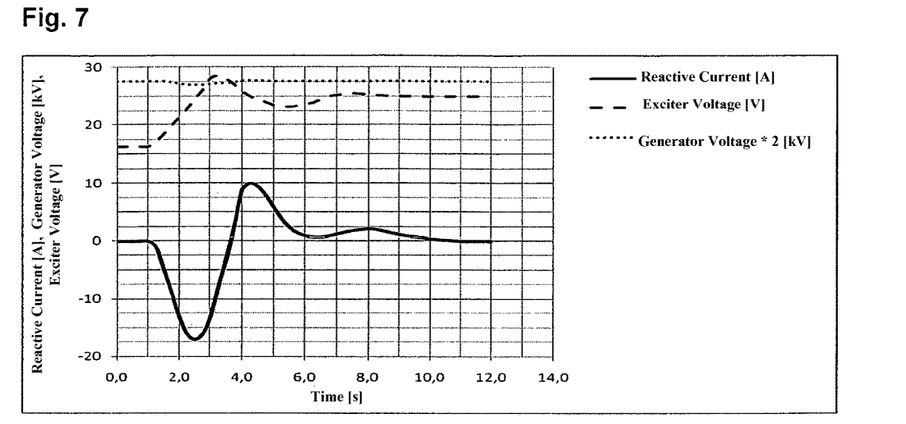
FIG. 7 shows the reactive current that is to be set in a significant performance leap of the wind power installation.

FIG. 7 shows a similar picture for a significant performance leap of the wind power installation from 60% to 100% of the rated output at the time of 1.0. The exciter requires roughly 5 seconds until the reactive current is again adjusted roughly to the original setpoint of 0 A. The generator voltage also oscillates here according to the reactive current that is to be set.

In this connection, with an optimally matched control of the exciter voltage, under certain circumstances, improvements can still be achieved, but the behavior shown in FIG. 6 and FIG. 7 is not sufficient to meet the continuously rising demands on the current quality. For this reason, it is necessary to achieve improvements with respect to dynamic reactive current compensation.

One important property of electrical differential drives according to FIG. 2 compared to hydrostatic or hydrodynamic differential drives is the direct power flow from the differential drive 6 via frequency converters 7 into the network. These frequency converters are preferably so-called IGBT converters in which the reactive power that is delivered into the network and that is received from the network can be freely adjusted. For this purpose, e.g., by means of freely programmable control, various control methods can be implemented, or optionally also during operation, they can be matched to changing ambient and/or operating conditions of the wind power installation. Highly dynamic frequency converters are preferably used that within extremely short times can feed large amounts of reactive current (up to, e.g., the rated current of the frequency converter, or for reduced clock frequency of the frequency converter even beyond) into the network or can take them out of the network. In this way, an important disadvantage of separately-excited synchronous generators can be compensated.

Figure 8:
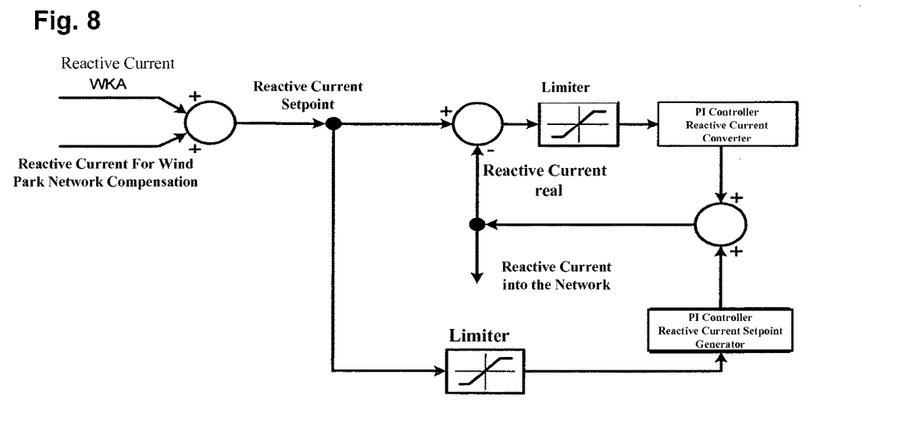
FIG. 8 shows one possible control diagram for a combined reactive current control.

FIG. 8 shows a control method that satisfies this demand. Fundamentally, for the wind park, a reactive current setpoint is stipulated that is input as a constant or as a variable, e.g., by an external control. This reactive current setpoint can be stipulated by, e.g., a higher-order wind park control unit according to a fixed or variable distribution key to the individual wind power installations as so-called "reactive current WKA" as a fixed parameter or as a variable. In this connection, a value that is preferably but not necessarily the same for all wind power installations is defined. The reactive current portion, "reactive current for wind part network compensation," which is required for the necessary compensation of the following wind park network, can be added to this "reactive current WKA." The "reactive current setpoint" is derived from the sum of the two values. This "reactive current setpoint" is relayed to the "PI controller reactive current-setpoint generator." FIG. 8 shows a PI controller, other controller types also being usable here. The "PI controller reactive current-setpoint generator" typically works with comparatively long time constants, i.e., the cycle time within which a change of the reactive current value in this case is possible, but due to the large power capacity of the generator, it can continuously deliver large amounts of reactive current. A comparator compares the "real reactive current" to the "reactive current setpoint." In addition, the comparatively low-power frequency converter 7 (FIG. 2) within a short time delivers the reactive power missing according to the "reactive current setpoint," or receives the latter in a reactive current excess from the network. The reactive current to be delivered from the frequency converter 7 is calculated by the "PI controller reactive current-setpoint converter." The two control circuits preferably have a so-called "limiter" that limits the possible reactive current for the generator and frequency converter.

Figure 9:
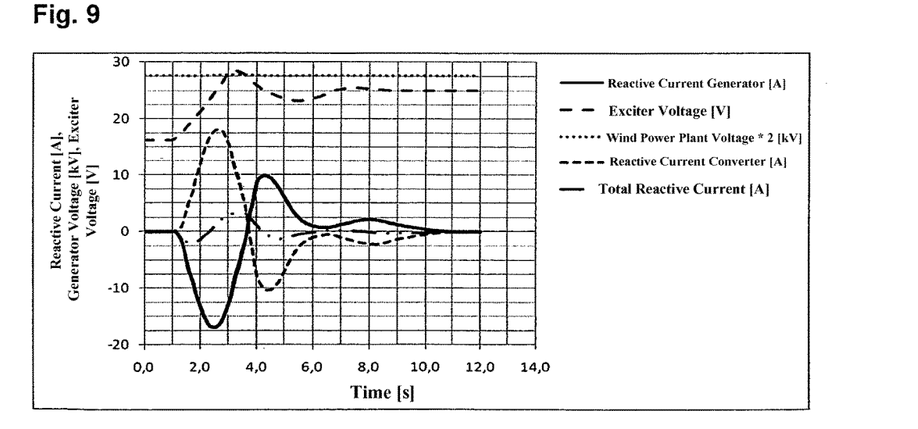
FIG. 9 shows the reactive current that is to be set in a significant performance leap of the wind power installation with reactive current compensation by a frequency converter.

FIG. 9 shows the effect of this control method. The "reactive current converter" is superimposed on the time behavior of the "reactive current generator" known from FIG. 7. Here, it is assumed that the frequency converter can adjust the current upward from 0 to rated current within 50 ms. By means of this short time constant, i.e., the cycle time, within which a change of the reactive current value in this case is possible, the frequency converter can equalize the unwanted deviation of the "reactive current generator" relatively promptly, as a result of which the maximum deviation from the "reactive current setpoint" is now only 3 A instead of, previously, 17 A. Accordingly, here, only one more minor fluctuation of the "WKA [wind power installation] voltage" can be detected.

More accurate and at least faster compensation of the "reactive current generator" by the frequency converter can be achieved in that the time for reactive current compensation is shortened by the frequency converter to the extent that as a result of a power/torque jump instruction of the wind power installation control, an altered reactive current demand is deduced, and the latter is stipulated accordingly in reactive current control with the aid of a mathematical model, based on a network impedance and the power to be transmitted.

In addition to the above-described measures with respect to reactive current control using an electrical differential drive, there is, however, still another important aspect that can be considered in the sense of a generally required high current quality. This is that wind power installations even with network voltage faults should remain on the network. This property is generally referred to as Low-Voltage-Ride-Through (LVRT) or High-Voltage-Ride-Through (HVRT) that is exactly defined in various guidelines (e.g., from the E.ON network). Even during an LVRT event with a voltage dip at 0V in the least favorable case at the network feed point or an HVRT event with overvoltage, as already mentioned, the wind power installation should remain on the network; this means that the speed of the generator 8 (FIG. 2) must be kept constant to the extent that the generator 8 when the voltage returns (i.e., return of the voltage to the rated value) is synchronous with the network. Moreover, the frequency converter during an HVRT event under certain circumstances can be taken from the network in order to protect it against unacceptable surges if, e.g., so-called surge diverters do not offer sufficient protection.

Figure 10:
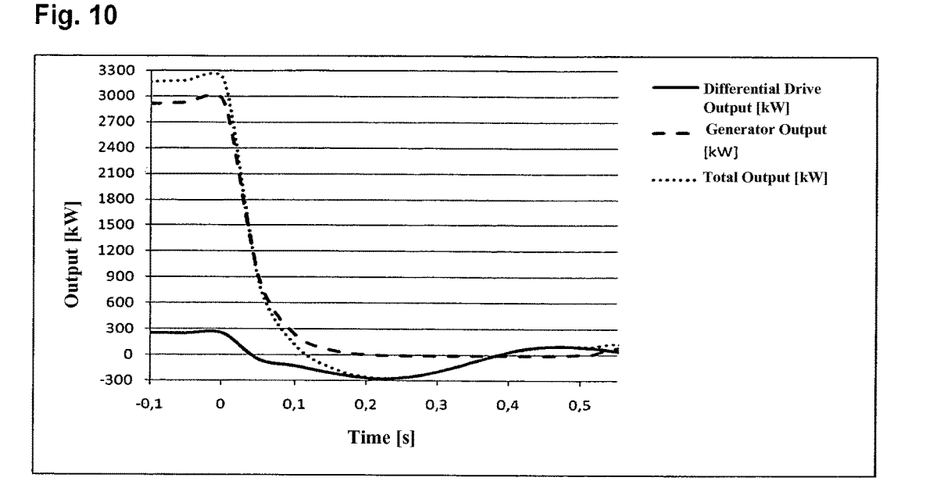
FIG. 10 shows one example for the power demand of the differential drive in LVRT.

For a 5 MW wind power installation, FIG. 10 shows the power characteristic of the differential drive during a possible LVRT event in which the network voltage at the time of 0 drops to zero for 500 ms. After the differential drive 6 at the start of the LVRT event delivers a power of roughly 300 kW with reference to the embodiment of FIG. 2, the latter drops within an extremely short time to 0 kW. Then, the differential drive 6 receives power up to roughly 300 kW. Since at this time, there is no network supply at all or at least no sufficient network supply, the differential drive 6 cannot maintain the necessary speed/torque control, and the rotor 1 of the wind power installation would cause the generator 8 to pull out, as a result of which the generator 8 can no longer hold the required speed in order to be synchronous with the network when the voltage returns. The illustrated example represents only one possibility of the time behavior of the output of the differential drive 6. According to the stochastic wind conditions and the speed/power prevailing at the starting time of the LVRT event for the rotor 1 of the wind power installation or the differential drive 6, it can, of course, likewise occur that the differential drive 6 must receive power at the first instant.

Figure 11:
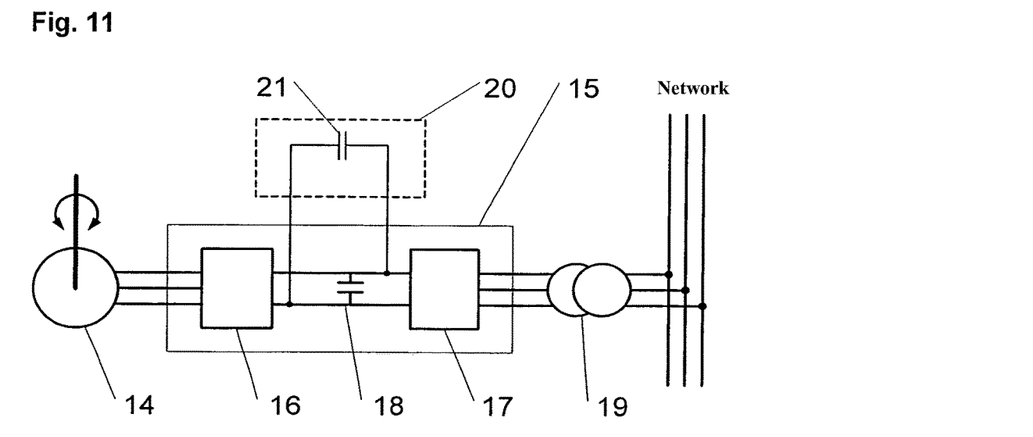
FIG. 11 shows an electrical differential drive with an intermediate circuit store according to this invention.

In order to prevent the generator 8 from being pulled out, FIG. 11 according to the invention shows an electrical differential drive with the following configuration. The differential drive 14 is connected to a frequency converter 15, consisting of motor-side IGBT bridge 16 and network-side IGBT bridge 17 and capacitor-supported DC intermediate circuit 18. The voltage of the frequency converter 15 is matched to the generator voltage by means of a transformer 19. An intermediate circuit store 20 that, among others, preferably has capacitors 21 is connected to the DC intermediate circuit 18. Alternatively, e.g., batteries can also be used. The capacitors 21 are preferably so-called supercaps that are already widely used in wind power installations as energy stores for rotor blade adjustment systems. The necessary capacitance of the capacitors 21 to be used is calculated from the sum of the energy that is necessary during a network disruption for driving the differential drive. Here, it must be considered that the intermediate circuit store 20 must both deliver energy and also store energy, its not being known which requirement applies first. That is to say, the intermediate circuit store 20 is preferably partially charged, then in this state there having to be enough capacity with respect to the maximally necessary supplier volume and maximally necessary volume of the store.

Energy production of the differential drive of initially roughly 10 kJ, followed by an energy demand of roughly 50 kJ, can be derived from the example according to FIG. 10. Subsequently, the production level/demand level flattens, or the LVRT event ends anyway after a total of 500 ms. That is to say, an intermediate circuit store 20 designed for 100 kJ should be precharged with roughly 50 kJ.

For reasons of optimization, the precharging of the intermediate circuit store 20 can be made dependent upon the operating state of the wind power installation. Since the differential drive at wind power installation speeds below the base speed is operated as a motor, in this operating range energy is first received from the intermediate circuit store 20. This means that the intermediate circuit store 20 must be charged according to the energy demand that is the maximum to be delivered. Conversely, the differential drive is operated as a generator at wind power installation speeds above the base speed; this means that the differential drive first charges the intermediate circuit in order to change for receiving according to FIG. 10. In this case, the precharging can therefore be less, with which the maximum necessary store volume of the intermediate circuit store 20 is reduced. That is to say, in order to make available sufficient energy from the intermediate circuit store in the example according to FIG. 10, the latter must be precharged with roughly 40 kJ. The 10 kJ still lacking for the total demand is charged at the start of the LVRT event by the differential drive.

Since the minimum necessary store energy is fundamentally related to the rated output of the wind power installation, thus for the optimized variant, the store energy that is the minimum required for the intermediate circuit store 20 can be defined with roughly 8 kJ/M $W_{(Wind\ Power\ Installation\ Rated\ Output)}$ or including sufficient reserve with roughly 12 kJ/M $W_{(Wind\ Power\ Installation\ Rated\ Output)}$. Conversely, for the design variant that is first described, at least 20 kJ/M $W_{(Wind\ Power\ Installation\ Rated\ Output)}$ is necessary.

If it is, moreover, considered that in many cases, the LVRT event lasts at most 150 ms, the required store energy is reduced to roughly ⅓ of the aforementioned minimum required store energy of roughly 8 kJ/M $W_{(Wind\ Power\ Installation\ Rated\ Output)}$, i.e., to roughly 2.5 kJ/MW$_{(Wind\ Power\ Installation\ Rated\ Output)}$.

If the intermediate circuit store is equipped with capacitors, the latter can be designed according to the following formula:

Energy [J]=Capacitance [F]*Voltage [V]²/2

Here, the voltage in the DC intermediate circuit of the frequency converter can typically fluctuate between an upper voltage boundary SpO=1,150 V and a lower voltage boundary SpU=900 V. That is to say, the maximum usable store energy in this case is calculated from Usable Store Energy=Capacitance=(SpO²−SpU²)/2.

In normal operation of the installation, i.e., if neither LVRT events nor HVRT events occur, the intermediate circuit store 20 will be charged between 20% and 80% of its usable store energy depending on the operating state of the installation, since for such a charging state, there is sufficient capacitance for all conceivable operating states.

In addition, it can be established here that for expert design, the capacitor package of the capacitor-supported DC intermediate circuit 18, which package is altogether much smaller, can be replaced by the intermediate circuit store 20.

An energy store could also be used as an intermediate circuit store 20 that is designed to be large so that it can assume not only the aforementioned function of the intermediate circuit store 20, but at the same time also the function of an energy store for the supply of other technical means of the wind power installation, such as, for example, the rotor blade adjustment system.

The frequency converter 15 has the control that is necessary for the suitable charging of the intermediate circuit store 20. Preferably, the voltage of the intermediate circuit store 20 is measured for this purpose. Alternatively, the intermediate circuit store 20 can also be charged by a separate charging means.

Figure 12:
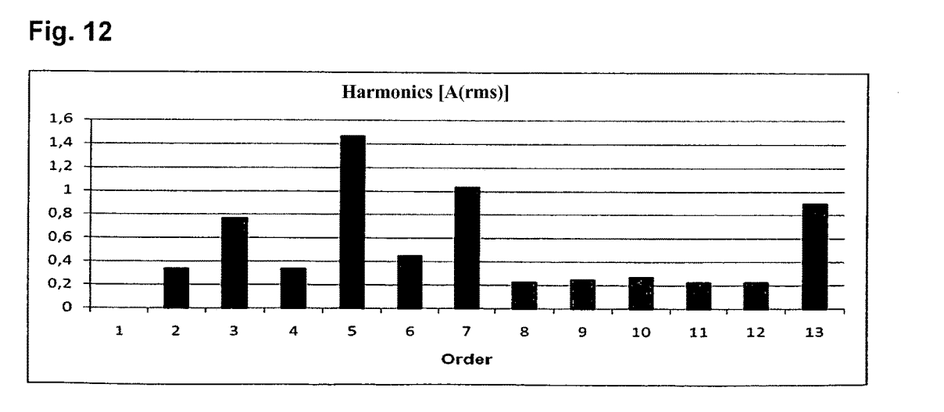
FIG. 12 shows the typical electrical harmonics of a medium-voltage synchronous generator.

For purposes of optimum current quality, in addition the topic of harmonics of separately-excited synchronous generators can also still be treated. FIG. 12 shows a typical harmonic spectrum of a separately-excited synchronous machine. Here, there are especially the harmonics of the 3rd, 5th, 7th and 13th order. Compared to wind power installations with, e.g., full-scale power converters, the latter are comparatively high and can be reduced by suitable measures. One possibility for reducing the amount of these harmonics is the corresponding mechanical design of the synchronous generator by means of so-called tilting of the rotor and/or short-pitching of rotor and stator. These measures are, however, associated with increased production costs, or they limit the availability of possible suppliers based on the lack of technical prerequisites.

Figure 13:
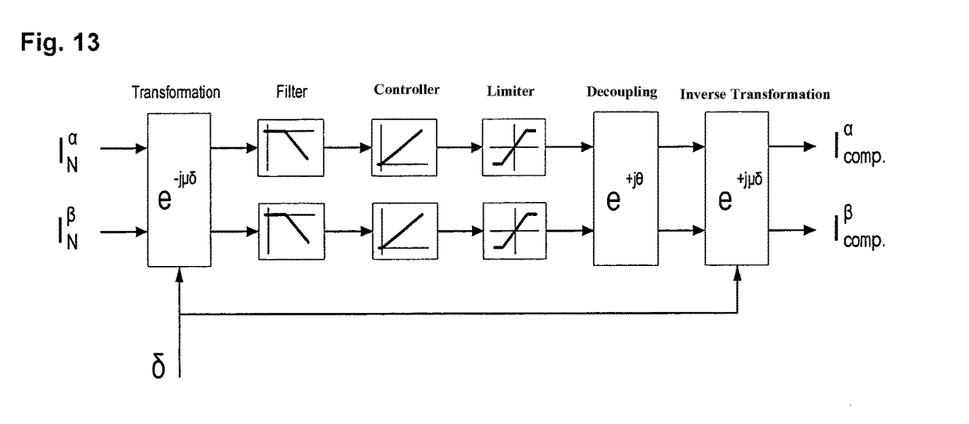
FIG. 13 shows one possible principle of active harmonic filtering with a frequency converter.

Therefore, the existing frequency converter 7 is used for active filtering of the harmonics of the synchronous generator. FIG. 13 shows a known method, the so-called frequency range method, with the stages transformation of the coordinate system, filter, controller, limiter, decoupling/prerotation and inverse transformation of the coordinate system. Thus, it is possible to produce harmonic currents by the frequency converter, which currents are opposite in phase to the measured currents, and thus to compensate selectively for harmonics in the network current.

In addition to the harmonics of the generator, in the network there can also be other harmonics that originate from, e.g., the frequency converter itself or that develop in some other way and that likewise reduce the current quality. By measuring the network voltage, all harmonics are detected and can be considered in active filtering.

Figure 14:
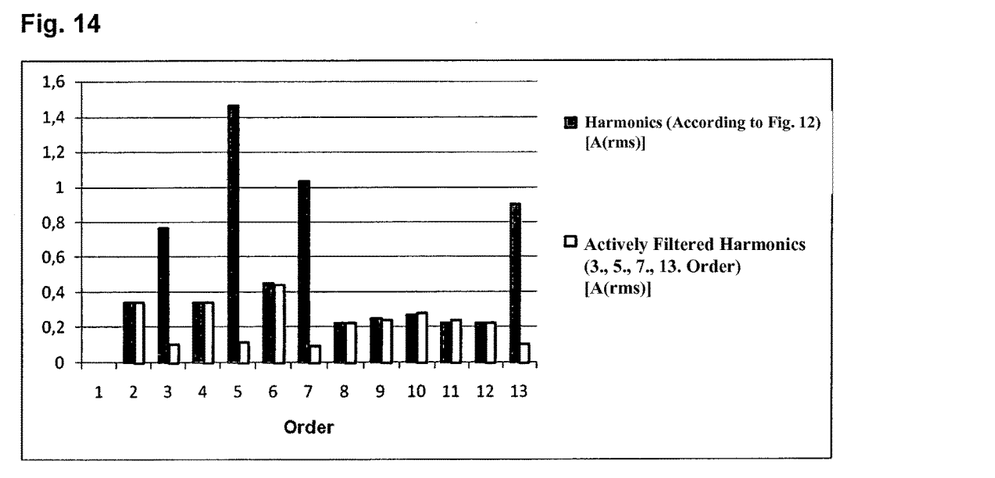
FIG. 14 shows the electrical harmonics of a medium-voltage synchronous generator with active harmonic filtering with a frequency converter.

FIG. 14 shows the substantial improvement of the harmonic spectrum with the actively filtered harmonics of the 3rd, 5th, 7th and 13th order. The quality of the improvement is dependent upon the so-called clock frequency of the frequency converter, better results being achieved with higher clock frequencies.

The above-described embodiments can likewise be implemented in technically similar applications. This applies, among others, to hydroelectric plants for use of river and ocean flows. For this application, the same basic prerequisites as for wind power installations apply, specifically variable flow velocity. The drive shaft in these cases is driven directly or indirectly by the systems driven by the flow medium, for example water. Subsequently, the drive shaft directly or indirectly drives the differential transmission.

The invention claimed is:

1. A method for operating an energy-generating installation, with a differential transmission with an electrical differential drive, the differential drive being connected via a frequency converter to a DC intermediate circuit to a network, the method comprising:
feeding electrical energy, from the differential drive, into an electrical energy store in the DC intermediate circuit of the frequency converter in the case of a voltage dip or a power failure or an overvoltage of the network when the differential drive operates in an operating mode as a generator.

2. The method according to claim 1, wherein precharging of the electrical energy store is higher when the differential drive is operated as a generator than when a differential drive of an energy-generating installation is operated as a motor.

3. The method according to claim 1, wherein the electrical energy store is charged between about 20 percent and 80 percent of usable storage energy of the electrical energy store.

4. The method according to claim 1, wherein the energy-generating installation is a wind power installation.

5. A method for operating an energy-generating installation, with a differential transmission with an electrical differential drive, the differential drive being connected via a frequency converter to a DC intermediate circuit to a network, the method comprising:
supplying the differential drive with electrical energy with the aid of an electrical energy store in the DC intermediate circuit of the frequency converter in the case of a voltage dip or a power failure or an overvoltage of the network when the differential drive operates in an operating mode as a motor.

6. The method according to claim 5, wherein the electrical energy store will be charged corresponding to the operating state of the energy-generating installation.

7. The method according to claim 5, wherein precharging of the electrical energy store is higher when a differential drive of an energy-generating installation is operated as a generator than when the differential drive is operated as a motor.

8. The method according to claim 5, wherein the electrical energy store is charged between about 20 percent and percent of usable storage energy of the intermediate circuit store.

9. The method according to claim 5, wherein the energy-generating installation is a wind power installation.

\* \* \* \* \*